United States Patent [19]

Buzzell

[11] 4,358,039
[45] Nov. 9, 1982

[54] PAPER FEED ROLLER ASSEMBLY

[75] Inventor: James M. Buzzell, Deerfield, N.H.

[73] Assignee: Centronics Data Computer Corporation, Hudson, N.H.

[21] Appl. No.: 203,322

[22] Filed: Nov. 3, 1980

[51] Int. Cl.³ .................................................. G03B 1/24
[52] U.S. Cl. ...................................... 226/79; 242/68;
400/616.3
[58] Field of Search ........................ 226/52, 76–83,
226/190; 242/118.5, 129.7, 129.71, 68; 346/136;
400/616.1, 616.2, 616.3, 647, 647.1, 708

[56] References Cited

U.S. PATENT DOCUMENTS

| 2,346,163 | 4/1944 | Hiles | 197/133 |
| 2,782,894 | 2/1957 | Metzner | 197/133 |
| 2,819,782 | 1/1958 | Metzner et al. | 197/133 |
| 2,839,176 | 6/1958 | Metzner et al. | 197/133 |
| 2,858,926 | 11/1958 | Metzner | 197/133 |
| 2,858,927 | 11/1958 | Metzner et al. | 197/144 |
| 2,881,893 | 4/1959 | Metzner | 197/133 |
| 3,799,313 | 3/1974 | Shevick | 197/133 |

Primary Examiner—Leonard D. Christian
Attorney, Agent, or Firm—Kenway & Jenney

[57] ABSTRACT

An improved paper feed roller assembly for the paper feed mechanism of a printer is provided with an adjustable arrangement so that a plurality of different widths of perforated edge paper may be accommodated thereby. The arrangement includes a rotatable member having a plurality of indentations which cooperate with stops to select an axial position for the feed pins mounted on the roller, corresponding to the selected indentation.

19 Claims, 8 Drawing Figures

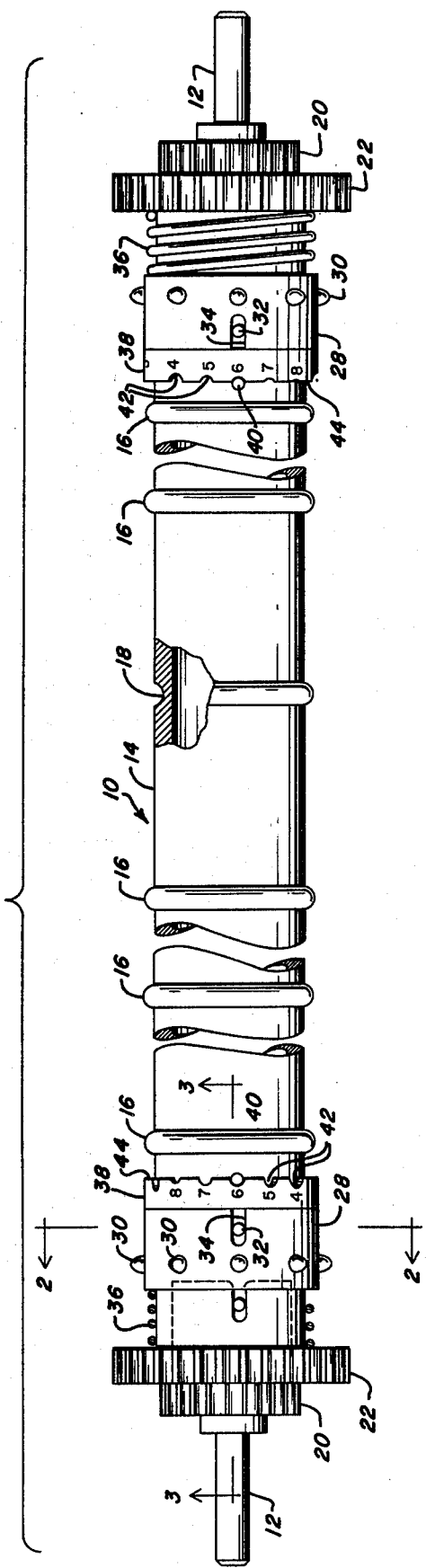
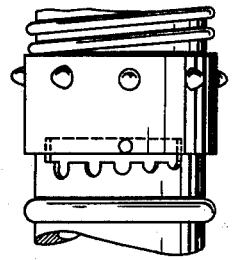
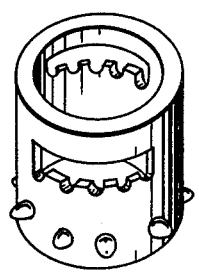
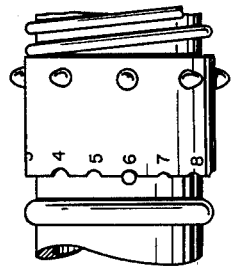

PAPER FEED ROLLER ASSEMBLY

BACKGROUND OF THE INVENTION

This invention relates to paper feed mechanisms for printers or the like and, more particularly, to an improved pin feed roller assembly for accommodating a plurality of widths of paper having sprocket feed holes.

Computer printers or the like are known where the paper, or other print record medium, is incrementally stepped along a paper path. In such a printer, one requirement is that the stepping be precisely controlled to maintain proper registration of the lines of print on the paper. One way of accomplishing this result is to provide the paper with a series of equally spaced perforations along the edges thereof and to provide the printer with a roller having sprocket wheels or pin wheels, or rings, with circumferentially spaced pins on the periphery thereof. These pin rings, hereinafter referred to as sprocket wheels, engage the perforations of the paper to feed the paper while maintaining the required registration. An illustrative paper feed mechanism utilizing such an arrangement is disclosed in U.S. Patent Application Ser. No. 040,911 entitled: PAPER FEED MECHANISM FOR PRINTERS AND THE LIKE, filed May 21, 1979 by David M. Wolfe, and assigned to the assignee of the present invention. In the reference application, a pair of sprocket wheels are fixedly mounted near the opposite ends of a paper feed roller. Thus, only one width of perforated edge paper may be accommodated by such assembly. Different countries for example, have different standards regarding the hole to hole dimensions, vis-a-vis the width of the paper, for paper having sprocket feed holes. One way of providing for the acceptance of different width paper in a single printer would be to provide a plurality of roller assemblies, one for each of the different hole to hole dimensions measured across the width of the paper. It would be desirable, however, to provide a more economical and practical arrangement for accommodating these different width papers.

It is, therefore, a primary object of this invention to provide a pin feed roller assembly that can accommodate a plurality of widths of perforated edge paper.

In the prior art, there have been a number of attempts to provide a "universal" pin feed roller assembly. Some of these attempts involve adjusting the length of the roller by providing, for example, variable length threaded sections. Other attempts involve moving the relative position of the sprocket wheels which are secured to the roller by set screws or the like. However, all of these attempts involve the use of special tools and require making very precise adjustments. Accordingly, these adjustments require a skilled technician in order to be made accurately. It would thus be desirable to have an arrangement whereby even a relatively unskilled operator may simply and yet precisely adjust the pin feed roller assembly to accommodate a plurality of widths of paper having sprocket feed holes.

It is, therefore, another object of this invention to provide a pin feed roller assembly which may accommodate a plurality of widths of paper having sprocket feedholes and which may be precisely and yet readily and easily adjusted by an operator without requiring the use of special tools or training.

SUMMARY OF THE INVENTION

The foregoing and additional objects are attained in accordance with this invention by providing a roller assembly which includes an elongated cylindrical roller and a first cylindrical shaped sleeve coaxially mounted on the roller and movable longitudinally thereon and having a plurality of radially extending pins spaced circumferentially thereabout adapted for engagement with the feed holes provided along the longitudinal sides of the paper. Further, there is provided means for biasing the first sleeve in a first direction along the axis of the roller and stop means for limiting the axial motion of the first sleeve by the biasing means, the axial position of the stop means being adjustable to one of a plurality of precise predetermined positions.

In accordance with an aspect of this invention, the stop means includes a second annular sleeve mounted on the roller adjacent the first sleeve, the second sleeve having a series of indentations of differing depth arranged along an edge thereof and spaced circumferentially around the second sleeve, and at least one pin mounted on the roller and extending radially outward therefrom, said pin being adapted to selectively engage one of the indentations so as to limit the longitudinal travel of the stop means in the axial direction of the roller and establish a position for the first sleeve which abuts the opposite edge of the second sleeve.

In another embodiment of the invention, the first and second sleeves may be united into a single sleeve and incorporating the functions of said first and second sleeves.

In still another embodiment of the invention, the indentations along one edge of the sleeve are of uniform depth while the edge along which the indentations are formed is diagonally aligned relative to the longitudinal axis of the sleeve.

BRIEF DESCRIPTION OF THE DRAWING

The foregoing will be more readily apparent upon reading the following description in conjunction with the drawings wherein:

FIG. 1 is a plan view partially sectionalized of an improved pin feed roller assembly constructed in accordance with the principles of this invention;

FIG. 4c shows a side view of another embodiment of the sleeve shown in FIG. 4b; and FIGS. 5 to 7 are plan, perspective and plan views respectively showing alternative embodiments of the present invention.

DETAILED DESCRIPTION OF THE INVENTION AND THE PREFERRED EMBODIMENTS THEREOF

Figure 2:
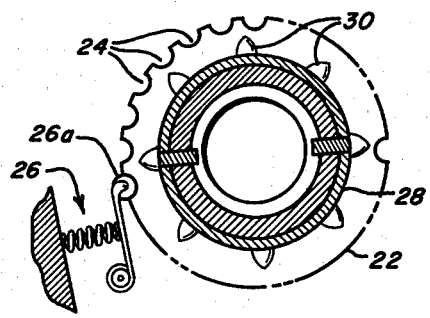
FIG. 2 is a sectional view taken along the lines 2—2 of FIG. 1.

Referring now to the drawing, wherein like elements in different figures thereof have the same reference numeral applied thereto, FIG. 1 shows an improved pin feed roller assembly designated generally by the reference numeral 10. The roller assembly 10 is mounted to rotate about a pair of stub shafts 12, 12 adapted to be journaled in suitable bearings (not shown) for rotational movement of the roller assembly 10. A suitable bearing is shown for example, in FIG. 2d of the aforementioned co-pending application Ser. No. 040,911. The roller assembly 10 includes a roller comprising an elongated hollow cylinder 14 having a plurality of longitudinally spaced resilient O-rings 16 mounted in grooved recesses 18 provided therefor. As described in the referenced patent application, the O-rings 16 which are slightly stretched are provided for the purpose of frictionally engaging both perforated and non-perforated paper which may be fed by the paper feed mechanism.

Figure 3:
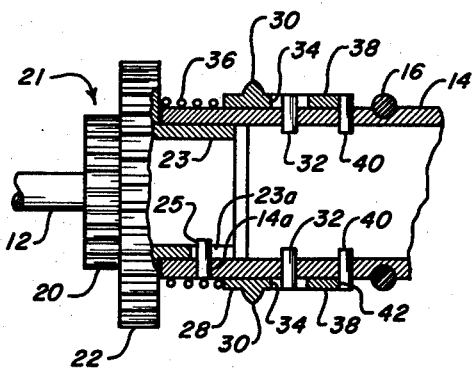
FIG. 3 is a partial sectional view taken along the line 3—3 of FIG. 1.

To accommodate the pin feed mechanism, the roller assembly 10 has mounted on at least one end thereof a ratchet wheel 20 which is adapted to cooperate with a solenoid driven pawl (as disclosed in the reference patent application) to incrementally and precisely advance the roller assembly 10 through a predetermined angle. Inward of the ratchet wheel 20 there is provided an operator-accessible knurled thumbwheel 22. The thumbwheel 22 is fixedly mounted with respect to the roller 14 and serves two functions. First, it allows the operator to manually rotate the roller assembly 10 for operator-positioning of the paper. Secondly, it is provided with a series of indentations 24 which cooperate with the roller 26a of a spring-biased detent assembly 26 to maintain the position of the roller assembly 10 after it is advanced by the solenoid-driven pawl (shown in FIG. 3c of application Ser. No. 040,911) which cooperates with the ratchet wheel 20.

Each stub shaft 12, ratchet wheel 20 and thumbwheel 22 form unitary subassembly 21 having a projecting hollow cylindrical sleeve 23 which is force-fitted into each end of cylinder 14. One subassembly is shown in detail in FIGS. 1 and 3. A pin 25, secured in an opening 14a in cylinder 14, extends radially inward through a slot 23a in sleeve 23 to prevent subassembly 21 from rotating relative to cylinder 14.

Mounted on the roller 14 for rotation therewith are a pair of sleeves 28, 28. Each of the sleeves 28, 28 has a plurality of radially extending pins 30 equally spaced circumferentially about each sleeve 28, the spacing between the pins 30 corresponding to the spacing between the feed holes along the longitudinal edges of the paper being fed. The size of the pins 30 is such that they enter into the feed holes for feeding engagement with the paper and without tearing the paper. In accordance with the principles of this invention, there is provided restraining means for allowing limited axial movement of the sleeve 28 while at the same time preventing rotation of sleeve 28 with respect to the cylinder 14. Illustratively, this is achieved by providing a pair of diametrically opposed pins 32, 32 mounted on the roller 14 and each sleeve 28 is provided with a pair of diametrically opposed axially aligned slots 34, 34. The pins 32 are received within the slots and allow the sleeves 28 to slide axially along the roller 14 but prevent rotation of sleeves 28 with respect to the roller 14. It should be noted that there is a relatively close fit between the outer diameter of the roller 14 and the inner diameter of the sleeves 28 to prevent sleeves 28 from being skewed on the roller 14. However, there is sufficient clearance between the sleeves 28 and roller 14 to allow sleeves 28 to freely slide axially along roller 14.

The improved pin feed roller assembly 10 according to this invention is provided with means for biasing each sleeve 28 in a predetermined axial direction along the cylinder 14. Each such direction is toward the center of the roller assembly 10 and the biasing means preferably includes a compression spring member. Illustratively, each compression spring member is a helical spring 36 encircling the periphery of roller 14. The vertical sides of thumbwheels 22 act as fixed abutments for the helical springs 36, each of which is positioned intermediate a thumbwheel 22 and a sleeve 28.

Figure 4A:
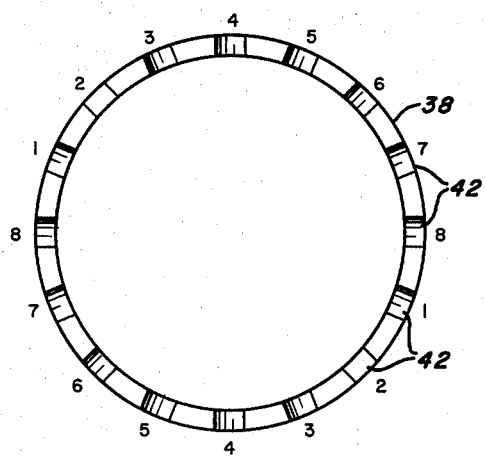
FIG. 4a is an end view of the adjustable annular sleeve.
Figure 4B:
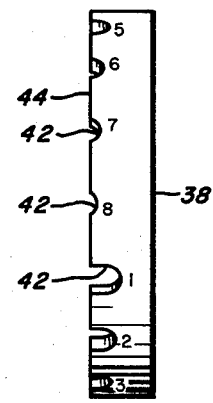
FIG. 4b is a side view of the adjustable annular sleeve.

In order to provide for precise adjustments of the axial distance between the pins 30 on the sleeves 28, there is provided a second pair of rotatable sleeves 28 mounted on the roller 14, each sleeve 38 being adjacent to and abutting one of the sleeves 28 and on the opposite side thereof from the springs 36. Diametrically opposed pins 40 are fixedly secured to cylinder 14 and extend outwardly therefrom to limit the rotatable sleeves 38 from axial movement past the pins 40 toward the center of the roller assembly 10. Each of the sleeves 38 is formed with a series of arcuate indentations 42 along its inward edge 44. The pins 40 fit within the indentations 42. The indentations 42 are formed of differing depth so that the precise axial position of each of the sleeves 38 is determined by which of the indentations 42 is aligned with the pins 40. Illustratively, there are eight different depths of the indentations 42, numbered "1" through "8". As clearly shown in FIG. 4a, in a preferred embodiment there are actually eight pairs of the indentations 42 circumferentially spaced about the rotatable sleeves 38, with the indentations of each pair having the same depth and lying along a common diameter. Thus, the pins 40 which, it will be recalled, are diametrically opposed to each other on the roller 14, are always inserted into indentations of equal depth.

The depths of the indentations 42 are chosen to satisfy the needs of the particular application. For example, indentations may be chosen to accommodate the requirements in European countries as their hole-to-hole paper dimensions which differ from one country to another by approximately 0.080". The eight different indentation depths 42 in the rotatable sleeves 38 differ incrementally, for example, by 0.006" and 0.007". However, other spacings may be employed if desired.

To use the aforedescribed paper feed roller assembly 10, the operator is provided with instructions as to which of the numbered indentations on the rotatable sleeves 3 are to be used with the various sizes of paper. To set the pin-to-pin distance to accommodate a selected paper size, the operator grasps each of the rotatable rings 38 and pushes it toward the adjacent sleeve 28 and against the biasing forces of its corresponding helical spring 36 to free the indentations 42 from the cooperating pins 40. The rotatable sleeve 38 is then rotated until the appropriately numbered indentations are juxtaposed with the cooperating pins 40. The sleeve 38 is then released and through the action of the spring 36, the selected depth indentations are aligned with and bear against the associated pins 40. This operation simply and yet precisely sets the axial position of the pin sleeves 28 and accordingly, the axial pin-to-pin distance between the sets of pins 30, 30. Thus, a relatively unskilled operator can adjust the roller assembly 10 to accommodate any one of a plurality of widths of perforated edge paper with a simple "push and twist" movement and without the need for any tools or prior training. The aforedescribed arrangement has a self-locking action through the springs 36, the indentations 42, and the pins 40, so that the assembly automatically retains its set position. The depths of the indentations 42 in the rotatable sleeves 38 are preferably standardized and may be readily tabulated on a simple chart with their correspondence to the different sized paper totally avoiding the need for measurements on the part of the operator.

In another alternative embodiment, the numbers employed in FIGS. 1, 4a, 4b and 5 may be eliminated and replaced with a single index mark 42a in the form of a "dot" at location 6 (FIG. 4a) indicating the most common paper width as a handy reference for the operator. The ring 38 is also preferably machined to provide a textured surface portion 42b, 42c opposite each "6" position as shown best in FIGS. 4a and 4b and being placed upon an otherwise smooth surface.

The indentations may be of uniform depth as shown in the alternative embodiment 38' of FIG. 4c wherein indentations 42', of equal depth, are formed in sloping edge 44'. The advantage of this design is that sleeve 38' need not be moved in the direction A against its biasing spring as great a distance as the sleeve 38 shown in FIG. 4b. To illustrate this advantage, the edge 44 has been shown in dotted fashion in FIG. 4c. Thus, sleeve 38' need only move in the direction of arrow A an amount sufficient to clear the indentation and engage sloping edge 44' while the sleeve embodiment 38 must be moved a much greater distance to remove pin 40 (FIG. 3) from an indentation so that pin 40 engages edge 44b.

As a further modification, the sleeves 38 may be eliminated and the indentations 42 may be placed along the edges of sleeves 28. Pins 32 may be eliminated to allow sleeves 28 to rotate during initial positioning. Thereafter, pins 40 serve to cooperate with indentations 42 to prevent rotation of sleeves 28 and to accurately axially position the sleeves 28 along roller 14. Alternatively each sleeve 38 may be made integral with its associated sleeve 28. The pins 32 and slots 34 may be eliminated since they are no longer necessary for this embodiment since pins 40 serve to prevent rotation of the joined sleeves 38 and 28 when they are in the operative position.

Noting FIG. 5, there is shown therein a unitary sleeve 50 having projecting pins 52 for entry into the feed holes of the elongated web (not shown). Operation of the onepiece unitary sleeve 50 is substantially identical to those described hereinabove in that sleeve 50 is moved toward the thumbwheel 22 against the force of helical spring 36 until the indentations 54 along left-hand edge 56 of sleeve 50 are clear of pin 40. Sleeve 50 is then rotated to align the appropriate number along the desired indentation with pin 40. Although only one sleeve 50 is shown in FIG. 5, it should be understood that both sleeves operate in a similar fashion.

It should be noted that this version as shown requires that the adjustment position of edge 56 must be the same for each ring or the angular relationship of the pins 52 on each end of tube 14 are not identical, resulting in skewed paper. Referring to FIG. 1, pin 32 engaging slot 34 in ring 28 maintains the angular relationship of pin 30 on each side regardless of adjustment position. This could be overcome by placing adjustment grooves 54 having the identical quantity and pitch in the same positions as pins 52 so that the operator cannot make a mistake. A similar arrangement may be provided for the FIG. 6 and FIG. 7 embodiments. Also, if a design requires a specific relationship of sprocket-fed paper to another feature of the mechanism such as a printer of the print line having a predetermined physical relationship between a print line and a tear-off bar, the FIG. 1 embodiment maintains this uniform width adjustment whereas the embodiments of FIGS. 5, 6 or 7 will not necessarily achieve this unless grooves 54 are at intervals of line spacing such as 1/6" in our case of the present invention. This statement holds true for printers in which there is a fixed relationship between the line feed advance mechanism and the drive roll.

FIG. 6 shows another alternative embodiment wherein the indentations need not be positioned along one edge of the sleeve. As shown in FIG. 6, sleeve 60 is provided with pins 62 and a pair of arcuate slots 64 and 66 diametrically opposed to one another, each arcuate slot having a plurality of indentations 68 and 69. A corresponding indentation of equal depth is provided in each slot 64, 66 so that indentations of equal depth lie at opposite ends of a common diameter. The diametrically opposed pins 40 are each arranged to be slidably received by slots 64 and 66. The operation of the sleeve 60 of FIG. 6 is substantially the same as that of FIG. 5 wherein the sleeve, when mounted upon a roller assembly of the type shown in FIG. 5, for example, is pressed against helical spring 36 in order to move pins 40 out of the identations 68 and 69 and into the main portion of the arcuate slots 64 and 66. The sleeve may then be rotated to the appropriate position in order to accommodate paper of the desired width. When the sleeve 60 is released, spring 36 urges the pins 40 into the selected indentations. It should be noted that the use of a single sleeve is possible as per the embodiments of FIGS. 5 and 6 since the pins 40, 40 cooperate with the indentations to prevent rotation of the sleeve 50 in the case of FIG. 5 and sleeve 60, in the case of FIG. 6 when the sleeves 50 and 60 are in the operative position.

The embodiment of FIG. 7 may be considered to constitute a reversal of parts wherein sleeve 70 is provided with a plurality of pins 72 for insertion into the feed holes of the web for positive driving of the web and is further provided with a pair of diametrically opposed pins 74, only one of which is shown in FIG. 7. Roller 14 is provided with a pair of arcuate recesses 76, only one of which is shown in FIG. 7 and which may be considered to be similar to the arcuate wheels 64, 66 of FIG. 6. Each of the recesses 76 is provided with a plurality of indentations 78 of differing depth. Pin 74 is adapted to be slidably arranged within recess 76. In order to position sleeve 70, the sleeve 70 is moved toward the right against the force of helical spring 36, thus releasing pin 74 from all of the indentations and into the main portion of recess 76. Sleeve 70 is then free to be rotated until pin 74 is aligned with the desired one of the group of indentations 78, at which time sleeve 70 is released. Spring 36 urges sleeve 70 toward the left, moving pin 74 firmly into engagement with the selected indentation. The pin not shown in FIG. 7 and which is diametrically opposite pin 74, enters an indentation of substantially identical depth, thus maintaining the sleeve 70 at the desired axial location along roller 14 in order to feed a web of the desired width. Roller 14 may be provided either with shallow recesses 76, or recess 76 may be a slot extending through roller 14, there being at least web portions 14d and 14e between the arcuate slots.

Accordingly, there has been described an improved roller assembly for a paper feed mechanism which is readily adjustable to accommodate any one of a plurality of widths of paper having pin feed holes. If desired, one of the sleeves 38 may be omitted and its associated sleeve 28 may be fixedly secured to roller 14. While this invention has been described with reference to a preferred embodiment, numerous other variations, modifications and adaptations of the present invention will be apparent to those skilled in the art and such as come within the spirit and scope of the appended claims are considered to be embraced by the present invention. For example, the paper may be any elongated web of indeterminate length having sprocket feed holes arranged longitudinally along said web, i.e., along one or both sides or spaced inwardly from the longitudinal sides.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. In a web feeding mechanism a roller assembly for accommodating any one of a plurality of webs of differing widths and having feed holes, comprising:
   an elongated cylindrical shaped roller;
   a sleeve coaxially mounted on said roller and axially slidable thereon and having a plurality of radially extending pins spaced circumferentially thereabout and adapted for engagement with the feed holes of said web;
   resilient means for normally urging said sleeve in a predetermined axial direction along said roller; and
   said sleeve including positioning means for axially positioning said sleeve along said roller, said positioning means being adjustable to one of a plurality of precise predetermined positions, said resilient means being adapted to retain said positioning means in its selected position said positioning means including indentations arranged along one edge of said sleeve and being of differing depths and projection means on said roller cooperating with said indentations for axially positioning said first sleeve according to the indentation aligned with said projection.

2. The roller assembly according to claim 1, wherein said roller has an outwardly extending abutment and said resilient means includes a compressible spring member positioned between said abutment and said sleeve.

3. The roller assembly according to claim 2, wherein said compression spring member is a helical spring encircling said roller.

4. The roller assembly according to claim 1, wherein said positioning means includes a second annular sleeve rotatably mounted on said roller and abutting said first sleeve, said second sleeve having a plurality of indentations of differing depth arranged along an edge thereof spaced circumferentially around said second sleeve, and a pin mounted on said roller and extending radially outward therefrom, said pin being selectively engagable with one of said indentations so as to limit the axial movement of said positioning means and thereby establish a predetermined axial position for said first sleeve along said roller.

5. The roller assembly according to claim 1 further including restraining means for enabling said first sleeve to be axially moved while preventing rotation of said first sleeve with respect to said roller.

6. The roller assembly according to claim 5, wherein said first sleeve includes a pair of diametrically opposed axially aligned slots and said restraining means includes a pair of diametrically opposed pins mounted on said roller and extending radially outward therefrom, said pins each extending into one of said slots.

7. The roller assembly according to claim 6, wherein said roller has an outwardly extending abutment and said resilient means includes a compressible spring member positioned between said abutment and said first sleeve.

8. The roller assembly according to claim 7, wherein said compressible spring member is a helical spring encircling said roller.

9. In a paper feed roller assembly for printers and the like including a roller and a pair of spaced apart sleeves mounted on said roller for rotation therewith, said sleeves including pins for feeding engagement with paper having feed holes along opposite longitudinal edges, an arrangement for selectively setting the axial spacing between said sleeves including adjustable positioning means associated with each of said sleeves, each of said positioning means comprising a plurality of indentations arranged about said sleeves each being of a respective predetermined depth;
   a stop member for each positioning means fixedly mounted on said roller and each adapted to fit within a selected indentation; and
   resilient means for normally urging each of said sleeves against a respective one of said stop members to maintain the respective stop member within a selected indentation.

10. The paper feed arrangement according to claim 9, wherein said roller includes a pair of abutments and said resilient means includes a pair of helical springs surrounding said roller and each positioned intermediate a respective abutment and sleeve.

11. In a paper feed roller assembly for printers and the like including a roller and a pair of spaced apart paper feed sleeves mounted on said roller for rotation therewith, said paper feed sleeves having pins for feeding engagement with paper having feed holes along opposite longitudinal edges, an arrangement for selectively setting the axial spacing between said pair of paper feed sleeves comprising:
   a pair of adjustable positioning sleeves mounted on the roller, each of said positioning sleeves having a plurality of indentations each of a respective predetermined depth;
   a stop member for each positioning sleeve fixedly mounted on said roller and each adapted to fit within a selected indentation portion of a respective positioning sleeve; and
   resilient means for normally urging each of said paper feed sleeves against a respective one of said positioning sleeves so as to maintain the respective stop member within a selected indentation.

12. The roller assembly, according to claim 1, wherein said positioning means comprises at least one pin secured to each said sleeve and extending inwardly toward said roller; and
   said roller having a recess provided with indentations of varying depth cooperating with said pin for axially positioning said sleeve.

13. The roller assembly of claim 1, wherein said positioning means includes an arcuate slot provided in said sleeve intermediate the edges thereof;
   said slot having a plurality of indentations of different depth arranged along one edge of said arcuate slot and spaced circumferentially about said arcuate slot; and a pin mounted on said roller and extending radially outward therefrom and into said slot, said pin selectively engaging one of said indentations to adjust the axial position of said sleeve.

14. The roller assembly of claim 12 wherein said positioning means comprises indentations arranged along one edge of said sleeve, the axial distance between the bottom of each indentation and said pins being different.

15. The roller of claim 14, wherein said one edge is diagonally aligned relative to the longitudinal axis of said sleeve.

16. The roller of claim 15 wherein the depth of the indentations along said one edge is substantially uniform.

17. The roller assembly of claim 14 wherein the number and angular spacing of said indentations is the same as the number and angular spacing of said radially extending pins.

18. The roller assembly of claim 14 further comprising locating means provided on said sleeve for identifying the location of at least one of the axially selectable positions.

19. The roller assembly of claim 18 wherein said locating means comprises a textured surface portion provided upon an otherwise smooth surface.

* * * * *